(12) United States Patent
Noda et al.

(10) Patent No.: US 11,067,769 B2
(45) Date of Patent: Jul. 20, 2021

(54) LENS BARREL AND IMAGE CAPTURING APPARATUS

(71) Applicant: CANON KABUSHIKI KAISHA, Tokyo (JP)

(72) Inventors: Atsuto Noda, Tokyo (JP); Nobuyoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 16/272,782

(22) Filed: Feb. 11, 2019

(65) Prior Publication Data

US 2019/0258022 A1 Aug. 22, 2019

(30) Foreign Application Priority Data

Feb. 16, 2018 (JP) .............................. JP2018-026309

(51) Int. Cl.
*G02B 7/04* (2021.01)
*G02B 7/10* (2021.01)

(52) U.S. Cl.
CPC ..................... *G02B 7/04* (2013.01); *G02B 7/10* (2013.01)

(58) Field of Classification Search
CPC . G02B 7/10; G02B 7/02; G02B 7/021; G02B 7/04; G02B 7/08; G02B 7/023; G02B 7/026; G02B 7/105; G03B 17/12; G03B 17/04; G03B 17/02; G03B 17/425; G03B 5/00

USPC ....... 359/557, 694–703, 819, 825, 826, 830; 396/52–55, 72, 73, 75, 77, 348, 349, 421, 396/428

See application file for complete search history.

(56) References Cited

U.S. PATENT DOCUMENTS

| | | | |
|---|---|---|---|
| 6,069,745 A | 5/2000 | Fujii et al. | |
| 6,278,843 B1 | 8/2001 | Iwasaki et al. | |
| 2005/0174657 A1 | 8/2005 | Honsho | |
| 2008/0094730 A1 | 4/2008 | Toma | |
| 2008/0174883 A1 | 7/2008 | Oya | |
| 2011/0026137 A1 | 2/2011 | Kato | |
| 2011/0069403 A1* | 3/2011 | Oikawa | G02B 7/102 359/817 |

FOREIGN PATENT DOCUMENTS

| | | |
|---|---|---|
| CN | 1162726 C | 8/2004 |
| CN | 101226267 A | 7/2008 |
| CN | 100416328 C | 9/2008 |
| CN | 1015124408 A | 8/2009 |
| CN | 102023367 A | 4/2011 |
| JP | 06-94964 A | 4/1994 |
| WO | 2008096455 A1 | 8/2008 |

\* cited by examiner

*Primary Examiner* — Jie Lei
(74) *Attorney, Agent, or Firm* — Canon U.S.A., Inc. IP Division

(57) ABSTRACT

In a lens barrel, a first drive unit is driven to thereby cause a third lens holding frame to be movable in an optical axis direction relatively to a first lens holding frame and a second lens holding frame. One end of a guide shaft is fixed to the first lens holding frame, and another end of the guide shaft is fixed to the second lens holding frame.

10 Claims, 9 Drawing Sheets

FIG.9B ary embodiment of the present invention.

LENS BARREL AND IMAGE CAPTURING APPARATUS

BACKGROUND OF THE INVENTION

Field of the Invention

The present invention relates to a lens barrel and an image capturing apparatus, such as a digital camera or a video camera, which incorporates the lens barrel.

Description of the Related Art

To improve the optical performance of a zoom lens barrel having a configuration in which a plurality of lens groups is movable in an optical axis direction by zooming, it is required to increase the accuracy in relative positions and the like between lenses.

An adjustment mechanism for adjusting the inclination, eccentricity, and the like between lenses that have heretofore been required to be achieved with a high accuracy can be used.

However, the use of such an adjustment mechanism is disadvantageous in that a structure of the lens barrel is complicated and a size of the lens barrel is increased.

In another configuration example, as discussed in Japanese Patent Application Laid-Open No. H06-94964, the inclination and the eccentricity between lenses are suppressed by supporting a plurality of lens groups using the same guide shaft.

However, the configuration example discussed in Japanese Patent Application Laid-Open No. H06-94964 requires a long guide shaft, which makes it difficult to adapt the configuration to a retractable zoom lens barrel.

SUMMARY OF THE INVENTION

The present invention is directed to improving a lens performance by increasing the accuracy in relative positions among a plurality of lens groups movable in an optical axis direction in a retractable zoom lens barrel.

According to an aspect of the present invention, a lens barrel includes a first lens holding frame configured to be movable in an optical axis direction, a second lens holding frame configured to be movable in the optical axis direction and to move in the optical axis direction relatively to the first lens holding frame, a third lens holding frame disposed between the first lens holding frame and the second lens holding frame in the optical axis direction, a guide shaft extending in the optical axis direction, and a first drive unit configured to cause the third lens holding frame to move along the guide shaft in the optical axis direction relatively to the first lens holding frame and the second lens holding frame. The guide shaft is supported by the first lens holding frame and the second lens holding frame and is positioned in a direction orthogonal to an optical axis. At least one of the first lens holding frame and the second lens holding frame is movable in the optical axis direction with respect to the guide shaft while the guide shaft is positioned in the direction orthogonal to the optical axis.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

In the drawings, the same members are denoted by the same reference numerals, and repeated descriptions thereof are omitted. In the present exemplary embodiment, an image capturing apparatus is described as an example of an optical device according to the present invention.

A lens barrel according to an exemplary embodiment of the present invention will be described with reference to FIGS. 1 to 5B.

Figure 1:
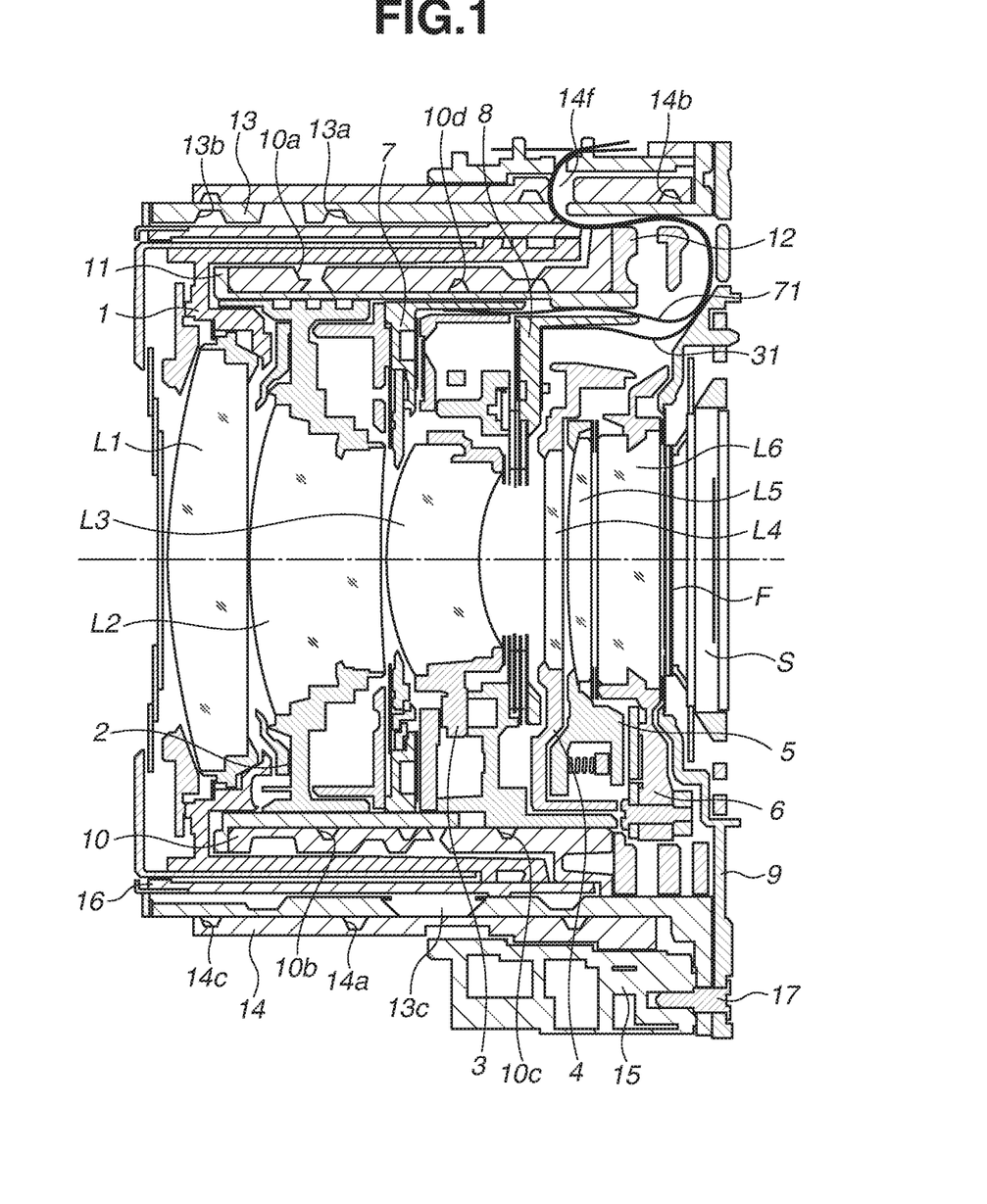
FIG. 1 is a sectional view illustrating a retracted state of a lens barrel according to an exemplary embodiment of the present invention.

FIG. 1 is a sectional view illustrating a retracted state of the lens barrel according to the exemplary embodiment of the present invention.

Figure 2:
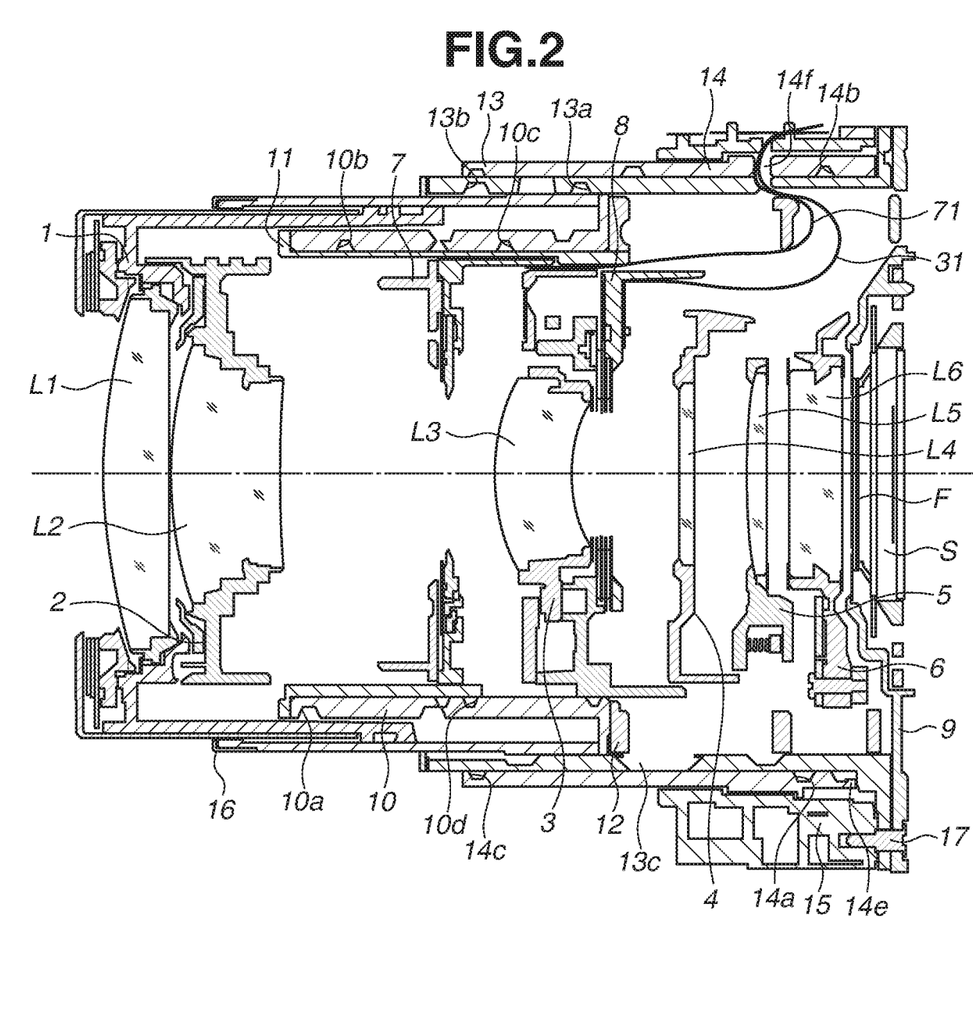
FIG. 2 is a sectional view illustrating the lens barrel according to the exemplary embodiment of the present invention during image capturing.

FIG. 2 is a sectional view illustrating the lens barrel during image capturing.

Figure 3:
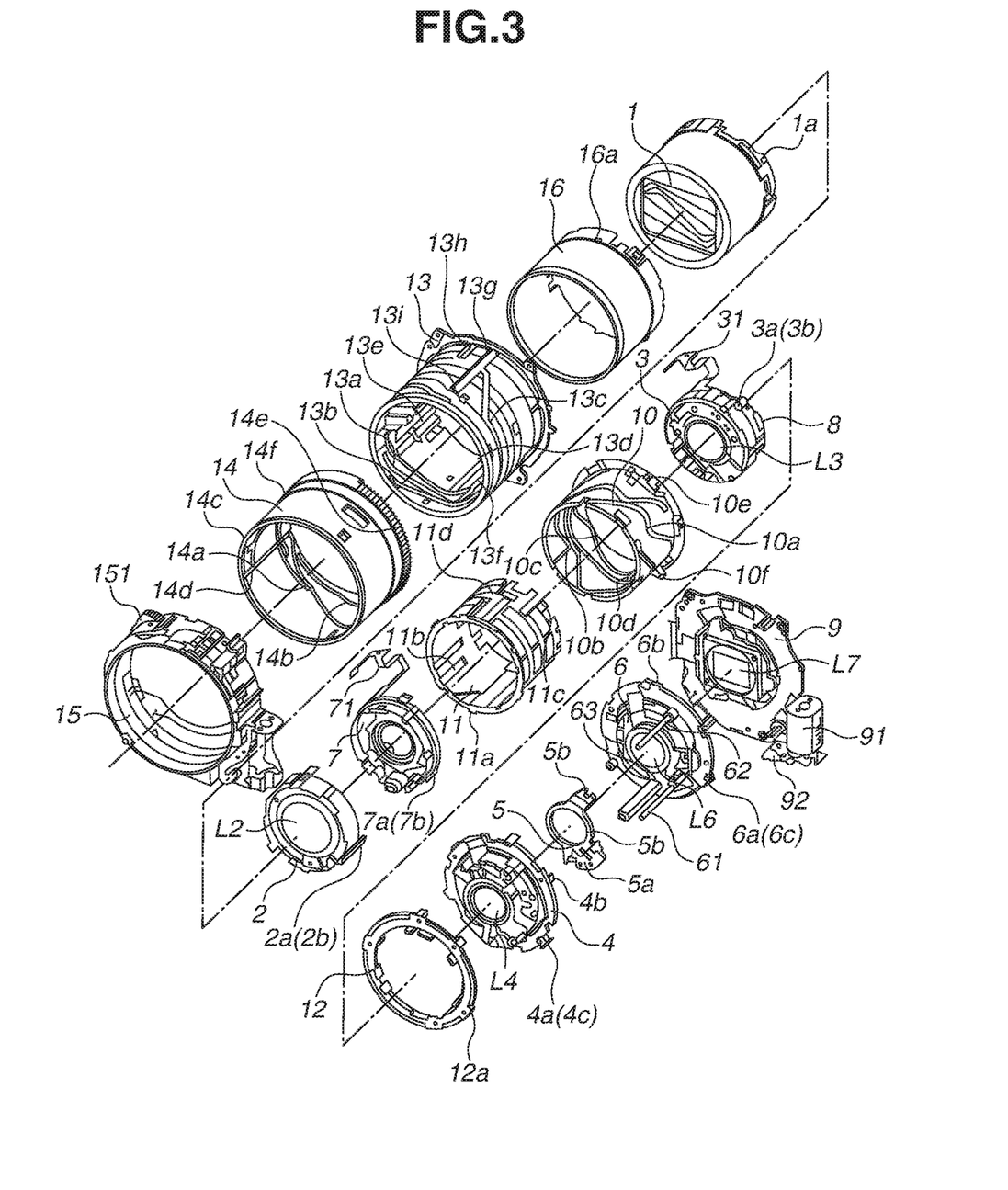
FIG. 3 is an exploded view illustrating the lens barrel according to the exemplary embodiment of the present invention.

FIG. 3 is an exploded view illustrating the lens barrel.

Figure 4:
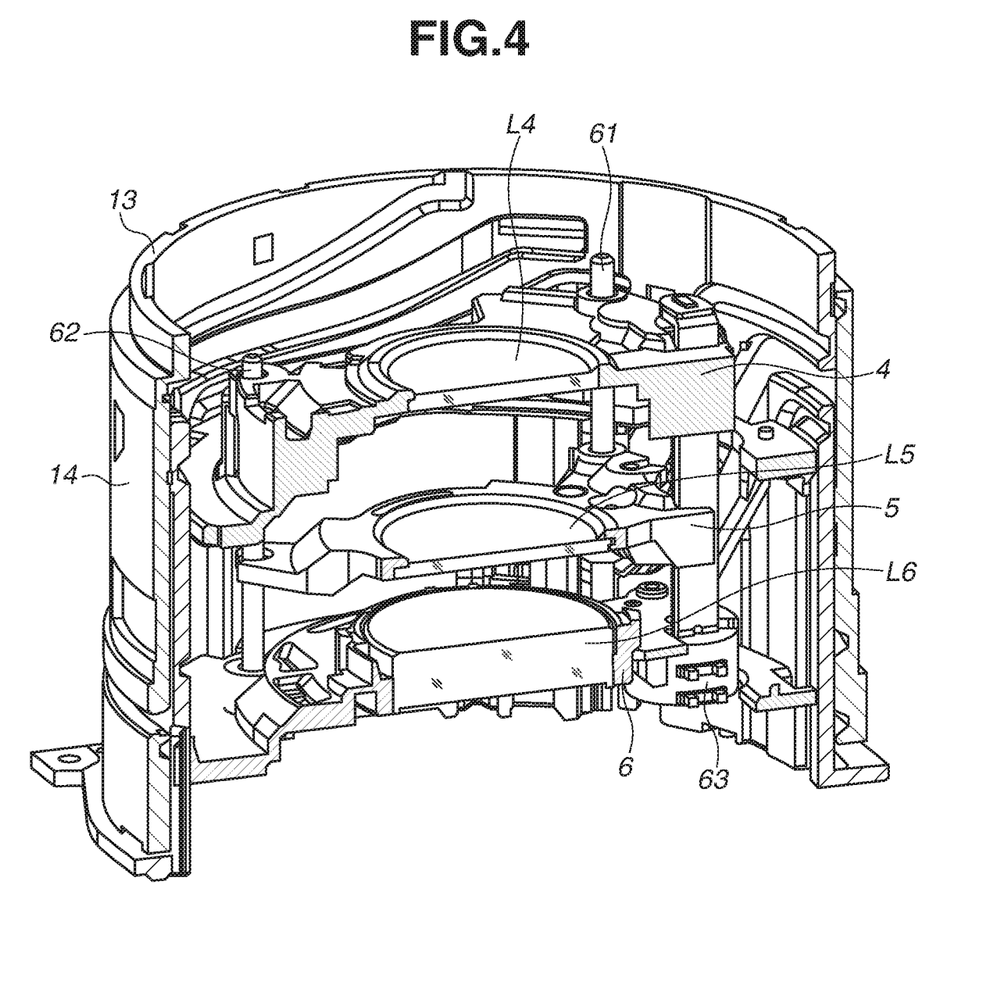
FIG. 4 is a three-dimensional sectional view illustrating main components in the lens barrel according to the exemplary embodiment of the present invention.

FIG. 4 is a three-dimensional sectional view illustrating characteristic elements according to the present exemplary embodiment.

Figure 5A:
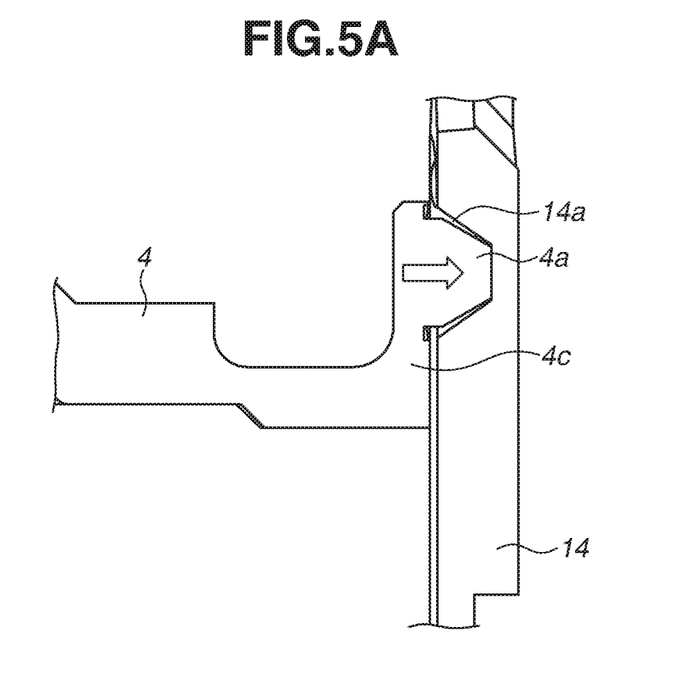
FIGS. 5A and 5B are sectional views each illustrating a biasing cam pin portion in the lens barrel according to the exemplary embodiment of the present invention.
Figure 5B:
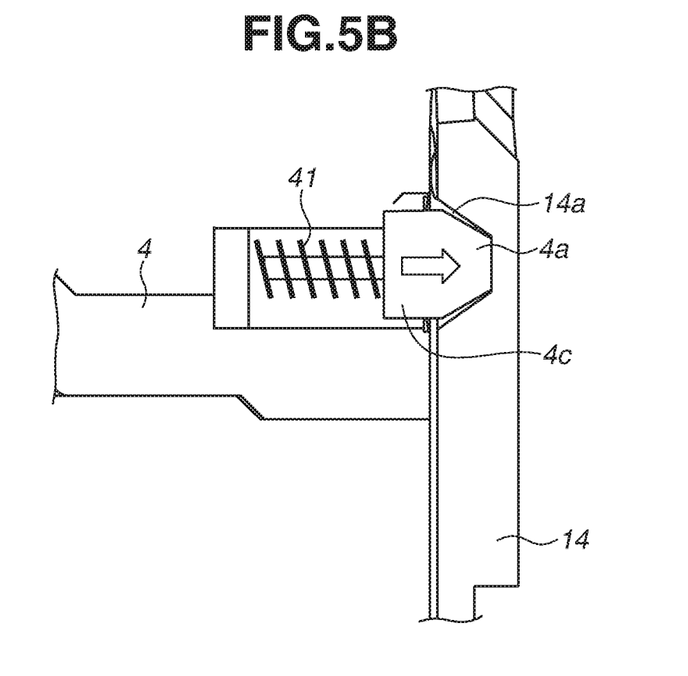

FIGS. 5A and 5B are sectional views each illustrating a biasing cam pin portion according to the present exemplary embodiment.

The lens barrel according to the present exemplary embodiment is an optical system with six group lenses, including a first group lens L1, a second group lens L2, a third group lens L3, a fourth group lens L4, a fifth group lens L5, and a sixth group lens L6.

A first group cylinder 1 holds the first group lens L1. A set of six cam pins 1a disposed at a lower portion on an inner circumferential surface of the first group cylinder 1 engages with cam grooves 10a formed in an outer circumferential surface of a cam cylinder 10.

The first group cylinder 1 is provided with straight-advancing grooves 1b (not illustrated) at three locations on the inner circumferential surface of the first group cylinder 1. The straight-advancing grooves 1b engage with straight-advancing keys 11a formed at an upper end on an outer circumferential surface of a straight-advancing cylinder 11.

A second group cylinder 2 holds the second group lens L2. A set of three cam pins 2a disposed at a lower portion on an outer circumferential surface of the second group cylinder 2 engages with cam grooves 10b formed in an inner circumferential surface of the cam cylinder 10.

The second group cylinder 2 is provided with straight-advancing keys 2b at the locations corresponding to the cam pins 2a. The straight-advancing keys 2b engage with straight-advancing grooves 11b formed in the straight-advancing cylinder 11.

An image blur correction device 3 holds the third group lens L3. A set of three cam pins 3a disposed on an outer circumferential surface of the image blur correction device 3 engages with cam grooves 10c formed in the inner circumferential surface of the cam cylinder 10.

The image blur correction device 3 is provided with straight-advancing keys 3b at the locations corresponding to the cam pins 3a. The straight-advancing keys 3b engage with straight-advancing grooves 11c formed in the straight-advancing cylinder 11.

A fourth group holding frame 4 holds the fourth group lens L4. A set of three cam pins 4a disposed at a lower portion on an outer circumferential surface of the fourth group holding frame 4 engages with cam grooves 14a formed in an inner circumferential surface of a drive cylinder 14.

One of the cam pins 4a serves as a biasing cam pin portion 4c that applies a biasing force to the cam groove 14a, thereby absorbing a backlash in the cam engagement.

For example, configurations as illustrated in FIGS. 5A and 5B can be used.

FIG. 5A illustrates a configuration for achieving cam engagement with elastic deformation by reducing a thickness of the biasing cam pin portion 4c which constitutes one of the cam pins 4a.

Specifically, the biasing cam pin portion 4c is deformed like a leaf spring and is thus biased against the cam groove 14a.

In addition, for example, there is another configuration in which, as illustrated in FIG. 5B, the biasing cam pin portion 4c is configured as a separate body and is biased in a radial direction by a cam biasing spring 41.

The fourth group holding frame 4 is provided with straight-advancing keys 4b at three locations at a lower portion on the outer circumferential surface of the fourth group holding frame 4. The straight-advancing keys 4b engage with straight-advancing grooves 13d formed in a fixed cylinder 13.

A fifth group holding frame 5 holds the fifth group lens L5.

A positioning portion 5a and shake preventing portions 5b, which are formed on the fifth group holding frame 5, engage with a main guide bar 61 and a sub-guide bar 62, and are supported so as to be movable in an optical axis direction. The main guide bar 61 and the sub-guide bar 62 are disposed on a sixth group holding frame 6.

A rack 51 (not illustrated) is disposed on the fifth group holding frame 5, and is mounted with screws on a stepping motor 63 serving as a first drive unit disposed on the sixth group holding frame 6.

The fifth group holding frame 5 is driven by an output from the stepping motor 63.

As a result, the fifth group holding frame 5 moves in the optical axis direction without rotation by an action of the positioning portion 5a, the shake preventing portions 5b, the main guide bar 61, and the sub-guide bar 62.

The sixth group holding frame 6 holds the sixth group lens L6.

A set of three cam pins 6a disposed at a lower portion on an outer circumferential surface of the sixth group holding frame 6 engages with cam grooves 14b formed in the inner circumferential surface of the drive cylinder 14.

Like the cam pins 4a described above, one of the cam pins 6a serves as a biasing cam pin portion 6c that is biased against the cam groove 14b, thereby absorbing a backlash in the cam engagement.

The sixth group holding frame 6 is provided with straight-advancing keys 6b at three locations at a lower portion on the outer circumferential surface of the sixth group holding frame 6. The straight-advancing keys 6b engage with straight-advancing grooves 13e formed in the fixed cylinder 13.

The sixth group holding frame 6 serving as a first lens holding frame is movable in the optical axis direction.

The fourth group holding frame 4 serving as a second lens holding frame is movable in the optical axis direction, and moves in the optical axis direction relatively to the first lens holding frame.

The fifth group holding frame 5 serving as a third lens holding frame is disposed between the sixth group holding frame 6 serving as the first lens holding frame and the fourth group holding frame 4 serving as the second lens holding frame.

The main guide bar (guide pin) 61 extends in the optical axis direction.

The stepping motor 63 serving as the first drive unit causes the fifth group holding frame 5 serving as the third lens holding frame to move in the optical axis direction along the main guide bar 61.

The stepping motor 63 serving as the first drive unit is driven to cause the fifth group holding frame 5 serving as the third lens holding frame to be movable in the optical axis direction relatively to the sixth group holding frame 6 serving as the first lens holding frame and the fourth group holding frame 4 serving as the second lens holding frame.

One end of the main guide bar 61 is fixed to the sixth group holding frame 6 serving as the first lens holding frame, and the other end of the main guide bar 61 is fixed to the fourth group holding frame 4 serving as the second lens holding frame.

A diaphragm device 7 is provided with a set of three cam pins 7a disposed on an outer circumferential surface of the diaphragm device 7. The cam pins 7a engage with cam grooves 10d formed in the inner circumferential surface of the cam cylinder 10.

The diaphragm device 7 is also provided with straight-advancing keys 7b at the locations corresponding to the cam pins 7a. The straight-advancing keys 7b engage with straight-advancing grooves 11d formed in the straight-advancing cylinder 11.

A shutter neutral density (ND) device 8 is fixed to the image blur correction device 3 with screws (not illustrated).

A set of three cam pins 10e disposed at a lower portion on the outer circumferential surface of the cam cylinder 10 engages with cam grooves 13a formed in an inner circumferential surface of the fixed cylinder 13.

A set of three drive pins 10f disposed at a lower portion on the outer circumferential surface of the cam cylinder 10 penetrates grooves 13c, which are formed in the fixed cylinder 13, and engages with straight-advancing grooves 14*d* formed in the inner circumferential surface of the drive cylinder 14.

The cam cylinder 10 is rotatably sandwiched between the straight-advancing cylinder 11 and a straight-advancing plate 12, and moves in the optical axis direction integrally with the straight-advancing cylinder 11.

A movable cover cylinder 16 is fixed to the cam cylinder 10 with a unit (not illustrated).

A set of three cam pins 16*a* disposed at a lower portion on an outer circumferential surface of the movable cover cylinder 16 is inserted into cam grooves 13*b*, which are formed in the fixed cylinder 13, with a small gap formed therebetween.

The straight-advancing cylinder 11 restricts linear movement of the first group cylinder 1, the second group cylinder 2, the image blur correction device 3, and the diaphragm device 7. The straight-advancing cylinder 11 is fixed to the straight-advancing plate 12 by a unit (not illustrated).

Three straight-advancing keys 12*a* formed on an outer circumferential surface of the straight-advancing plate 12 engage with straight-advancing grooves 13*f* formed in the fixed cylinder 13.

A gear portion 14*e* formed at a lower portion on an outer circumferential surface of the drive cylinder 14 is coupled to a drive device for the drive cylinder 14 that includes a direct current (DC) motor 91 and a plurality of gears 92.

When the drive cylinder 14 is rotated by an output from the drive device for the drive cylinder 14, the cam pins 10*e* of the cam cylinder 10 interact with the cam grooves 13*a* of the fixed cylinder 13.

Further, the drive cylinder 14 moves in the optical axis direction while rotating by the action of the drive pins 10*f* of the cam cylinder 10 and the straight-advancing grooves 14*d* of the drive cylinder 14.

The first group cylinder 1 moves in the optical axis direction without rotation by the action of the cam pins 1*a* of the first group cylinder 1 and the cam grooves 10*a* of the cam cylinder 10 and by the action of the straight-advancing grooves 1*b* (not illustrated) of the first group cylinder 1 and the straight-advancing keys 11*a* of the straight-advancing cylinder 11.

The second group cylinder 2 moves in the optical axis direction without rotation by the action of the cam pins 2*a* of the second group cylinder 2 and the cam grooves 10*b* of the cam cylinder 10 and by the action of the straight-advancing keys 2*b* of the second group cylinder 2 and the straight-advancing grooves 11*b* of the straight-advancing cylinder 11.

The image blur correction device 3 moves in the optical axis direction without rotation by the action of the cam pins 3*a* of the image blur correction device 3 and the cam grooves 10*c* of the cam cylinder 10 and by the action of the straight-advancing keys 3*b* of the image blur correction device 3 and the straight-advancing grooves 11*c* of the straight-advancing cylinder 11.

The fourth group holding frame 4 moves in the optical axis direction without rotation by the action of the cam pins 4*a* of the fourth group holding frame 4 and the cam grooves 14*a* of the drive cylinder 14 and by the action of the straight-advancing keys 4*b* of the fourth group holding frame 4 and the straight-advancing grooves 13*d* of the fixed cylinder 13.

The sixth group holding frame 6 moves in the optical axis direction without rotation by the action of the cam pins 6*a* of the sixth group holding frame 6 and the cam grooves 14*b* of the drive cylinder 14 and by the action of the straight-advancing keys 6*b* of the sixth group holding frame 6 and the straight-advancing grooves 13*e* of the fixed cylinder 13.

The diaphragm device 7 moves in the optical axis direction without rotation by the action of the cam pins 7*a* of the diaphragm device 7 and the cam grooves 10*d* of the cam cylinder 10 and by the action of the straight-advancing keys 7*b* of the diaphragm device 7 and the straight-advancing grooves 11*d* of the straight-advancing cylinder 11.

An image sensor S and an optical filter F are held on a fixed base plate 9. The fixed cylinder 13 and a fixed cover cylinder 15 are fixed to the fixed base plate 9 with a screw 17.

Features of the present invention will be described in detail with reference to FIG. 4.

The main guide bar 61 and the sub-guide bar 62 are press-fit to the sixth group holding frame 6, and are fixed in the optical axis direction and in a direction orthogonal to the optical axis direction.

The fifth group holding frame 5 engages with each of the main guide bar 61 and the sub-guide bar 62 as described above, and is movable in the optical axis direction independently of the sixth group holding frame 6.

Specifically, the fifth group holding frame 5 is supported slidably in the optical axis direction with respect to the main guide bar 61, and is fixed in the direction orthogonal to the optical axis direction.

The engagement between the fifth group holding frame 5 and the sub-guide bar 62 prevents a rotational shake about the axis of the main guide bar 61.

One end of the main guide bar 61 is press-fit to the sixth group holding frame 6 serving as the first lens holding frame, and the other end of the main guide bar 61 engages with the fourth group holding frame 4 serving as the second lens holding frame.

The sixth group holding frame 6 serving as the first lens holding frame is located closer to an image plane than the fifth group holding frame 5 serving as the third lens holding frame is. The fourth group holding frame 4 serving as the second lens holding frame is located closer to an object than the fifth group holding frame 5 serving as the third lens holding frame is.

Three cam grooves 14*b* and 18*b* serving as first cam grooves and three cam grooves 14*a* and 18*a* serving as second cam grooves are formed on the inside of the drive cylinder 14 and a cam cylinder 18, respectively.

An actuator 64 serving as a second drive unit rotationally drives the corresponding cam cylinder.

The sixth group holding frame 6 serving as the first lens holding frame includes a plurality of first cam pins, i.e., three cam pins including the cam pin 6*a*, the straight-advancing key 6*b*, and the biasing cam pin portion 6*c*, which engage with the first cam grooves, respectively.

The fourth group holding frame 4 serving as the second lens holding frame includes a plurality of second cam pins, i.e., three cam pins including the cam pin 4*a*, the straight-advancing key 4*b*, and the biasing cam pin portion 4*c*, which engage with the second cam grooves, respectively.

As the drive cylinder 14 and the cam cylinder 18 rotate, the first cam pins 6*a*, 6*b*, and 6*c* move in the optical axis direction by following the first cam grooves.

The second cam pins 4*a*, 4*b*, and 4*c* move in the optical axis direction by following the second cam grooves.

One of the first cam pins 6*c* that engages with the first cam groove 14*b* is biased against the first cam groove in a radial direction of the lens barrel.

The rest of the first cam pins 6a and 6b are not biased against the first cam grooves in the radial direction of the lens barrel.

One of the first cam pins 6c that is biased against the first cam groove in the radial direction of the lens barrel is located closest to the main guide bar 61 among the first cam pins 6a, 6b, and 6c in a circumferential direction of the lens barrel.

One of the second cam pins 4c that engages with the second cam groove 14a is biased against the second cam groove in the radial direction of the lens barrel.

The rest of the second cam pins 4a and 4b are not biased against the second cam grooves in the radial direction of the lens barrel.

One of the second cam pins 4c that is biased against the second cam groove in the radial direction of the lens barrel is located closest to the main guide bar 61 among the second cam pins 4a, 4b, and 4c in the circumferential direction of the lens barrel.

The main guide bar 61 is slightly inclined in a press-fit portion of the sixth group holding frame 6 depending on the accuracy of components.

Accordingly, the fifth group holding frame 5 follows the inclination direction of the main guide bar 61.

According to the present exemplary embodiment, in the fourth group holding frame 4, the straight-advancing key 4b serving as a positioning portion engages with the main guide bar 61 and the biasing cam pin portion 4c serving as a shake preventing portion engages with the sub-guide bar 62, like in the fifth group holding frame 5.

As described above, in the fourth group holding frame 4, the optical axis is positioned by the engagement between the cam pins 4a and the cam grooves 14a of the drive cylinder 14.

Therefore, the position of the main guide bar 61, i.e., a small inclination of the guide bar, is constrained.

With this configuration, it is possible to improve the accuracy in relative positions among the fourth group lens L4, the fifth group lens L5, and the sixth group lens L6, while positioning the optical axis of each lens with a high accuracy.

Advantageous effects using the above-described configuration according to the present exemplary embodiment will be described with reference to FIGS. 6A and 6B by comparing the present exemplary embodiment with conventional art.

Figure 6A:
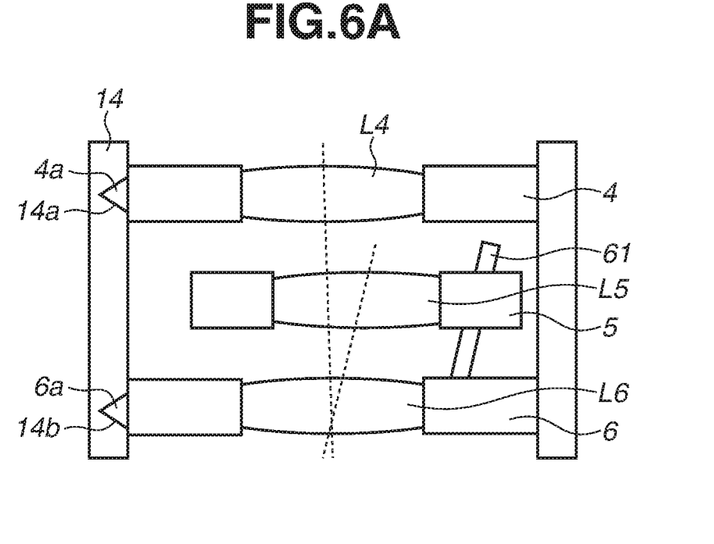
FIG. 6A is a schematic diagram illustrating a lens barrel according to conventional art.

FIG. 6A is a schematic diagram illustrating a configuration according to the conventional art.

Figure 6B:
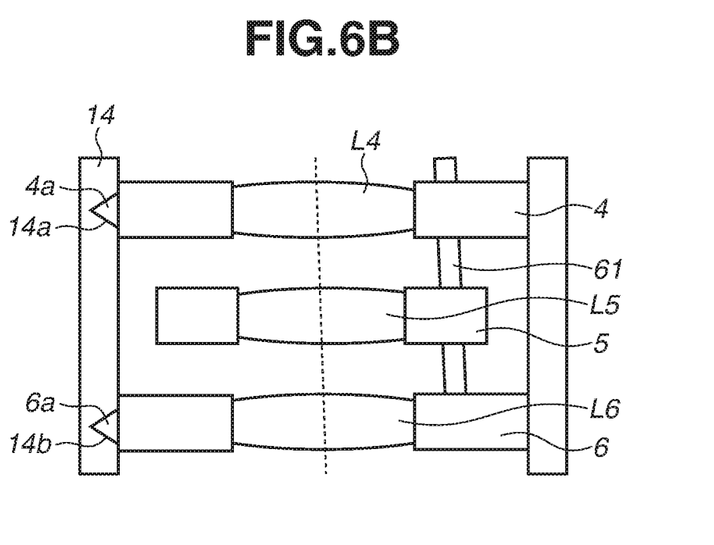
FIG. 6B is a schematic diagram illustrating the lens barrel according to the exemplary embodiment of the present invention.

FIG. 6B is a schematic diagram illustrating the configuration according to the present exemplary embodiment.

In the conventional art, as illustrated in FIG. 6A, the fifth group holding frame 5 engages with the main guide bar 61, which is press-fit to the sixth group holding frame 6, and is thus supported on the main guide bar 61.

Accordingly, the fifth group holding frame 5 follows the inclination direction of the main guide bar 61.

In this case, the fourth group holding frame 4 and the sixth group holding frame 6 are positioned by cam engagement with the drive cylinder 14.

Therefore, the accuracy in relative positions of the fourth group holding frame 4 and the sixth group holding frame 6 is determined depending on component errors of the cam grooves 14a and 14b of the drive cylinder 14.

Consider a case where a positional misalignment direction between the fourth group holding frame 4 and the sixth group holding frame 6 due to component errors of the cam grooves 14a and 14b is different from a positional misalignment direction of the fifth group holding frame 5 due to the inclination of the main guide bar 61.

In this case, the amount of relative positional misalignment between the fourth group holding frame 4 and the fifth group holding frame 5 increases.

Accordingly, in the configuration according to the present exemplary embodiment, as illustrated in FIG. 6B, the fourth group holding frame 4 engages with the main guide bar 61.

Therefore, the inclination direction of the main guide bar 61 is constrained and a relative positional misalignment between the fourth group holding frame 4 and the fifth group holding frame 5 can be prevented.

Consequently, it is possible to improve the accuracy in relative positions among the fourth group lens L4, the fifth group lens L5, and the sixth group lens L6.

In addition, to constrain the inclination of the main guide bar 61, a deformable portion 6d that is deformed in accordance with the inclination of the main guide bar 61 can be provided so that a press-fit portion of the main guide bar 61 of the sixth group holding frame 6 can be deformed.

For example, an area in the vicinity of the press-fit portion is thinned so that the press-fit portion of the main guide bar 61 of the sixth group holding frame 6 can be deformed.

Figure 7:
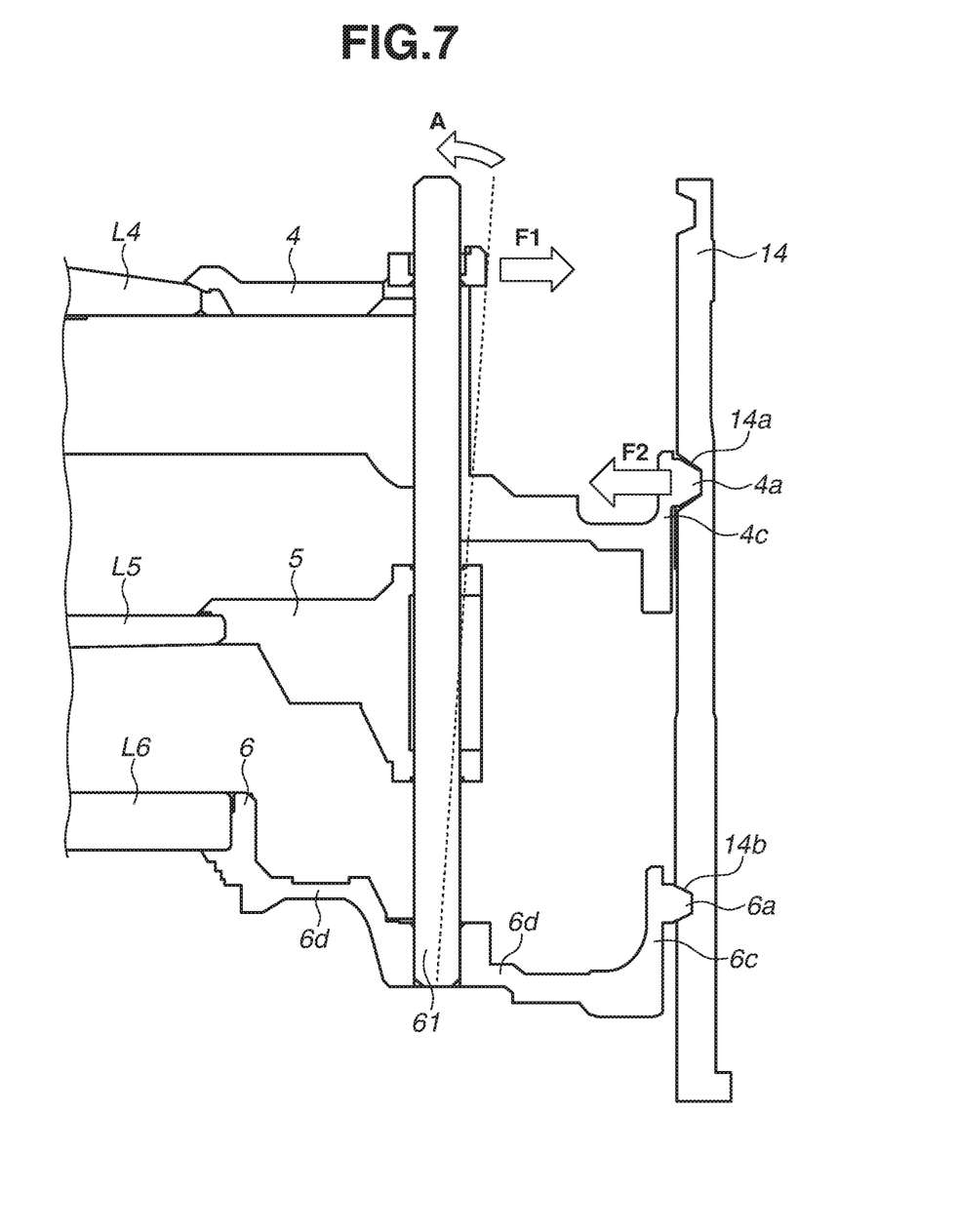
FIG. 7 is a schematic sectional view illustrating the vicinity of a guide bar and the vicinity of a biasing cam pin portion in the lens barrel according to the exemplary embodiment of the present invention.

FIG. 7 illustrates a sectional view of the press-fit portion of the main guide bar 61.

The provision of the deformable portion 6d as illustrated in FIG. 7 leads to a reduction in friction between the main guide bar 61 and the fourth group holding frame 4, and also leads to a reduction in an adverse effect on driving.

In addition, the main guide bar 61 is inclined as indicated by a dashed line in FIG. 7.

In a case where the inclination is corrected in a direction indicated by an arrow "A" in FIG. 7 by engagement with the fourth group holding frame 4 and by elastic deformation of the deformable portion 6d, a force F1 acts on the fourth group holding frame 4 as a reaction force in a direction indicated by an arrow in FIG. 7.

In this direction, a force opposite to a biasing force F2 generated by the biasing cam pin portion 4c can act as illustrated in FIG. 7.

If F1>F2 holds, a backlash elimination effect due to biasing of the biasing cam pin portion 4c against the cam groove 14a cannot be obtained. For this reason, at least the condition that F1<F2 is required.

The biasing force F2 of the second cam pin 4c that is biased against the second cam groove in the radial direction of the lens barrel is greater than the reaction force F1 of an elastic force generated at a press-fit portion at which one end of the main guide bar 61 is press-fit to the sixth group holding frame 6 serving as the first lens holding frame.

Figure 8:
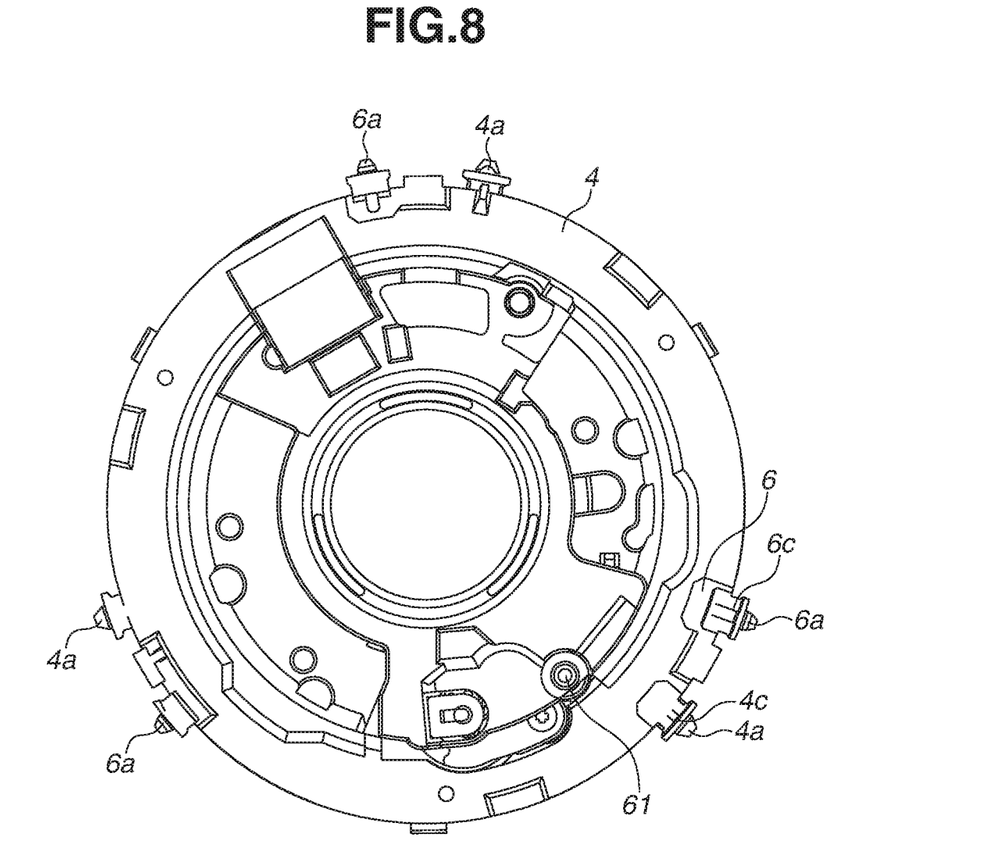
FIG. 8 illustrates a positional relationship between the guide bar and the biasing cam pin portion in the lens barrel according to the exemplary embodiment of the present invention.

In this case, for example, as illustrated in FIG. 8, the biasing cam pin portions 4c and 6c are disposed at a location closest to the main guide bar 61 among the respective three cam pins 4a and 6a.

The deformation of the deformable portion 6c in the above-described arrangement affects the components of the sixth group holding frame 6.

The effect of the force acting on the fourth group holding frame 4 on the components of the fourth group holding frame 4 when the main guide bar 61 is constrained can be absorbed in the vicinity of the main guide bar 61.

Thus, the effects on the lenses can be reduced.

Although the configuration in which the main guide bar 61 is fixed to the sixth group holding frame 6 and the fourth group holding frame 4 engages with the main guide bar 61 has been described above, the positional relationship between the components can be reversed.

That is, the main guide bar 61 can be fixed to the fourth group holding frame 4 and the sixth group holding frame 6 can engage with the main guide bar 61.

The configuration in which the fourth group holding frame 4 and the sixth group holding frame 6 are moved in the optical axis direction by cam engagement with the drive cylinder 14 has been described above as a unit that moves the fourth group holding frame 4 and the sixth group holding frame 6 in the optical axis direction. In addition, other units that move the fourth group holding frame 4 and the sixth group holding frame 6 in the optical axis direction will be described below.

Figure 9A:
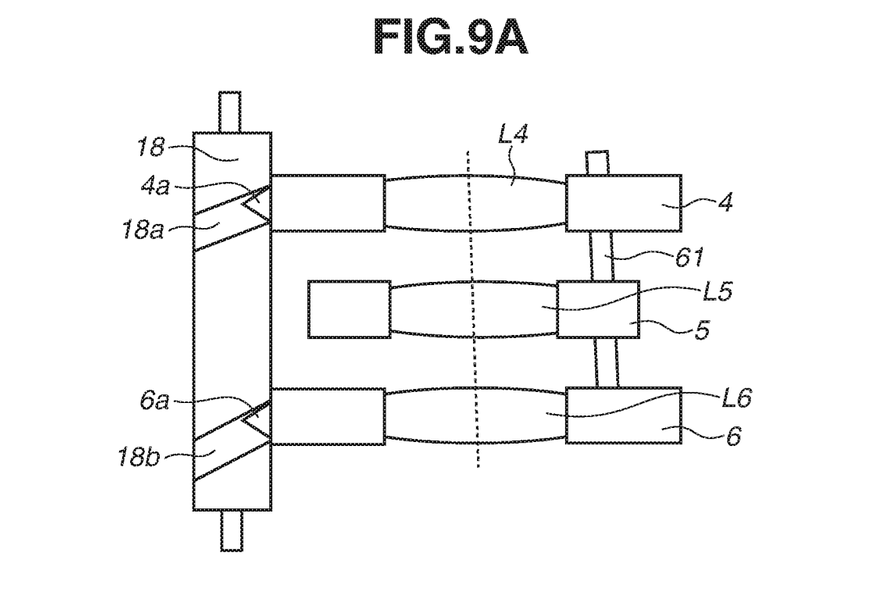
FIGS. 9A and 9B are schematic diagrams each illustrating a movement unit that moves lens holding frames in an optical axis direction in other exemplary embodiments of the lens barrel according to the exemplary embodiment of the present invention.

For example, as illustrated in FIG. 9A, the fourth group holding frame 4 and the sixth group holding frame 6 can be moved in the optical axis direction by cam engagement with the cam cylinder 18 that is provided with the cam grooves 18a that engage with the cam pins 4a of the fourth group holding frame 4, and the cam grooves 18b that engage with the cam pins 6a of the sixth group holding frame 6.

Figure 9B:
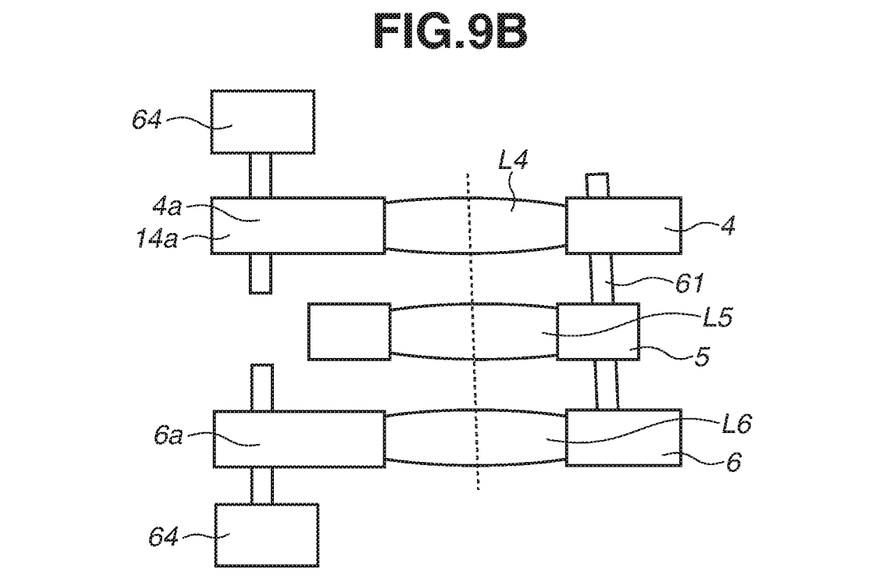

In addition, for example, as illustrated in FIG. 9B, the fourth group holding frame 4 and the sixth group holding frame 6 can be moved in the optical axis direction by actuators 64, such as stepping motors, respectively.

As described above, the main guide bar 61 is fixed to the sixth group lens holding frame 6 that is movable in the optical axis direction.

Further, the main guide bar 61 is supported by the fourth group holding frame 4 that is movable in the optical axis direction and moves in the optical axis direction relatively to the sixth group holding frame 6, and the fifth group holding frame 5 that is disposed between the fourth group holding frame 4 and the sixth group holding frame 6.

Furthermore, the fifth group holding frame 5 that is movable in the optical axis direction engages with the main guide bar 61 independently of the fourth group holding frame 4 and the sixth group holding frame 6.

With this configuration, it is possible to improve the accuracy in relative positions among a plurality of lens groups movable in the optical axis direction, while this configuration is adaptable to a retractable lens barrel.

According to an exemplary embodiment of the present invention, it is possible to provide a lens barrel capable of improving the lens performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-026309, filed Feb. 16, 2018, which is hereby incorporated by reference herein in its entirety.

What is claimed is:

1. A lens barrel comprising:
   a first lens holding frame configured to be movable in an optical axis direction;
   a second lens holding frame configured to be movable in the optical axis direction and to move in the optical axis direction relatively to the first lens holding frame;
   a third lens holding frame disposed between the first lens holding frame and the second lens holding frame in the optical axis direction;
   a guide shaft extending in the optical axis direction;
   a first drive unit configured to cause the third lens holding frame to move along the guide shaft in the optical axis direction relatively to the first lens holding frame and the second lens holding frame;
   a cam cylinder including a plurality of first cam grooves and a plurality of second cam grooves, the plurality of first cam grooves and the plurality of second cam grooves being formed on an inside of the cam cylinder; and
   a second drive unit configured to rotationally drive the cam cylinder, wherein the first lens holding frame includes a plurality of first cam pins that engage with the first cam grooves, respectively,
   wherein the second lens holding frame includes a plurality of second cam pins that engage with the second cam grooves, respectively,
   wherein as the cam cylinder rotates, the first cam pins move in the optical axis direction by following the first cam grooves, and the second cam pins move in the optical axis direction by following the second cam grooves,
   wherein the guide shaft is supported by both the first lens holding frame and the second lens holding frame, and both the first lens holding frame-side and the second lens holding frame-side of the guide shaft are positioned in a direction orthogonal to an optical axis,
   wherein one of the first lens holding frame and the second lens holding frame is movable in the optical axis direction with respect to the guide shaft while the guide shaft is positioned in the direction orthogonal to the optical axis, as the cam cylinder rotates, and
   wherein other of the first lens holding frame and the second lens holding frame is not movable in the optical axis direction with respect to the guide shaft while the guide shaft is positioned in the optical axis direction, as the cam cylinder rotates.

2. The lens barrel according to claim 1, wherein one portion of the guide shaft is press-fit to the first lens holding frame, and another portion of the guide shaft is supported by the second lens holding frame.

3. The lens barrel according to claim 2,
   wherein the first lens holding frame is located closer to an image plane than the third lens holding frame is, and
   wherein the second lens holding frame is located closer to an object than the third lens holding frame is.

4. The lens barrel according to claim 1, further comprising:
   a cam cylinder including a plurality of first cam grooves and a plurality of second cam grooves, the plurality of first cam grooves and the plurality of second cam grooves being formed on an inside of the cam cylinder; and
   a second drive unit configured to rotationally drive the cam cylinder,
   wherein the first lens holding frame includes a plurality of first cam pins that engage with the first cam grooves, respectively,
   wherein the second lens holding frame includes a plurality of second cam pins that engage with the second cam grooves, respectively, and
   wherein as the cam cylinder rotates, the first cam pins move in the optical axis direction by following the first cam grooves, and the second cam pins move in the optical axis direction by following the second cam grooves.

5. The lens barrel according to claim 4, wherein the first cam pins that engage with the first cam grooves, respectively, are biased against the first cam grooves in a radial direction of the lens barrel.

6. The lens barrel according to claim 5,
wherein the first cam pins that are not biased against the first cam grooves in the radial direction of the lens barrel are provided, and
wherein the first cam pin that is biased against the first cam groove in the radial direction of the lens barrel is located closest to the guide shaft among the first cam pins in a circumferential direction of the lens barrel.

7. The lens barrel according to claim 4, wherein the second cam pins that engage with the second cam grooves, respectively, are biased against the second cam grooves in a radial direction of the lens barrel.

8. The lens barrel according to claim 7,
wherein the second cam pins that are not biased against the second cam grooves in a radial direction of the lens barrel are provided, and
wherein the second cam pin that is biased against the second cam groove in the radial direction of the lens barrel is located closest to the guide shaft among the second cam pins in a circumferential direction of the lens barrel.

9. The lens barrel according to claim 8, wherein a biasing force of the second cam pins biased against the second cam grooves in the radial direction of the lens barrel is greater than a reaction force of an elastic force generated in a press-fit portion at which one end of the guide shaft is press-fit to the first lens holding frame.

10. An image capturing apparatus comprising:
the lens barrel according to claim 1; and
an image sensor.

* * * * *